United States Patent
Rohde et al.

(10) Patent No.: US 10,152,056 B2
(45) Date of Patent: *Dec. 11, 2018

(54) METHOD FOR SELECTING AN OPTIMIZED TRAJECTORY

(71) Applicant: Robert Bosch GmbH, Stuttgart (DE)

(72) Inventors: Jan Rohde, Stuttgart (DE); Holger Mielenz, Ostfildern (DE)

(73) Assignee: ROBERT BOSCH GMBH, Stuttgart (DE)

( * ) Notice: Subject to any disclaimer, the term of this patent is extended or adjusted under 35 U.S.C. 154(b) by 84 days.

This patent is subject to a terminal disclaimer.

(21) Appl. No.: 15/292,476

(22) Filed: Oct. 13, 2016

(65) Prior Publication Data
US 2017/0108865 A1    Apr. 20, 2017

(30) Foreign Application Priority Data

Oct. 20, 2015 (DE) .................. 10 2015 220 360

(51) Int. Cl.
*B60W 40/08* (2012.01)
*G05D 1/00* (2006.01)
(Continued)

(52) U.S. Cl.
CPC .......... *G05D 1/0061* (2013.01); *B60W 30/00* (2013.01); *B60W 40/08* (2013.01); *B62D 15/00* (2013.01); *B62D 15/0285* (2013.01); *G01C 21/3407* (2013.01); *G01S 13/931* (2013.01); *G05D 1/0214* (2013.01); *G06K 9/00845* (2013.01); *G08G 1/166* (2013.01); *G01S 15/931* (2013.01); *G01S 17/936* (2013.01); *G01S 2007/4039* (2013.01); *G01S 2007/4975* (2013.01); *G01S 2007/52009* (2013.01); *G01S 2013/9364* (2013.01); *G01S 2013/9367* (2013.01); *G05D 1/0088* (2013.01); *G05D 2201/0213* (2013.01); *G08G 1/16* (2013.01)

(58) Field of Classification Search
None
See application file for complete search history.

(56) References Cited

U.S. PATENT DOCUMENTS 8,930,060 B1 * 1/2015 Lu .................. G05D 1/0214
                                                      340/438
9,865,019 B2 * 1/2018 Bogovich ............. G06Q 40/08
(Continued)

FOREIGN PATENT DOCUMENTS

DE    102012008090    10/2013
WO    2015024616 A1    2/2015

*Primary Examiner* — Tamara L Weber
(74) *Attorney, Agent, or Firm* — Norton Rose Fulbright US LLP; Gerard Messina

(57) ABSTRACT

A method for generating a signal for transferring a partly or highly automated vehicle into a safe system state at a target site. First, a need to transfer the vehicle into a safe system state is ascertained. A vehicle state is then determined, the vehicle state encompassing the current vehicle position. At least one target site is ascertained. Travel trajectories are ascertained from the current vehicle position to the at least one target site. The travel trajectories are related. One of the travel trajectories is selected based on the rating that has been carried out. A signal is generated on the basis of the selected travel trajectory.

12 Claims, 2 Drawing Sheets

(51) Int. Cl.
  *G01C 21/34* (2006.01)
  *G05D 1/02* (2006.01)
  *B62D 15/00* (2006.01)
  *B62D 15/02* (2006.01)
  *B60W 30/00* (2006.01)
  *G01S 13/93* (2006.01)
  *G08G 1/16* (2006.01)
  *G06K 9/00* (2006.01)
  G01S 15/93 (2006.01)
  G01S 17/93 (2006.01)
  G01S 7/40 (2006.01)
  G01S 7/52 (2006.01)
  G01S 7/497 (2006.01)

(56) References Cited

U.S. PATENT DOCUMENTS

| | | | | |
|---|---|---|---|---|
| 2012/0083947 | A1* | 4/2012 | Anderson | B60W 30/09 701/3 |
| 2013/0151062 | A1* | 6/2013 | Lee | G05D 1/0212 701/26 |
| 2016/0297431 | A1 | 10/2016 | Eigel et al. | |
| 2016/0303969 | A1* | 10/2016 | Akula | B60K 35/00 |
| 2017/0057516 | A1* | 3/2017 | Gordon | B60W 40/08 |

* cited by examiner

__US 10,152,056 B2__

METHOD FOR SELECTING AN OPTIMIZED TRAJECTORY

CROSS REFERENCE

The present application claims the benefit under 35 U.S.C. § 119 of German Patent Application No. DE 102015220360.3 filed on Oct. 20, 2015, which is expressly incorporated herein by reference in its entirety.

FIELD

The present invention relates to a system for enhancing the safety of partly or highly automated vehicles in the event of a system error.

BACKGROUND INFORMATION

German Patent Application No. DE 10 2012 008 090 A1 describes a method or emergency stop assistant for carrying out a secure emergency stop maneuver of a traveling vehicle. In this, the driver is monitored, and vehicle state data are generated from which the degree of driving fitness is determined. What then occurs that the vehicle is transferred into an automatic driving mode if the degree of driving fitness of the driver falls below a predefined threshold, and a secure emergency stop maneuver is executed. In this context, a minimum-risk stoppage position is determined for the vehicle's emergency stop from predictive route data for the future travel path of the vehicle, and this stoppage position is traveled to using the automatic driving mode, in which context the secure emergency stop maneuver is carried out.

The publication of Fiorini et al. (Fiorini, P.; Shiller, Z., "Time optimal trajectory planning in dynamic environments," in Proceedings, 1996 IEEE International Conference on Robotics and Automation, Vol. 2, pp. 1553-1558, Vol. 2, Apr. 22-28, 1996) presents an algorithm for time-optimal planning of trajectories in dynamic environments. The publication of Werling et al. (Werling, M.; Ziegler, J.; Kammel, S.; Thrun, S., "Optimal trajectory generation for dynamic street scenarios in a Frenet frame," in 2010 IEEE International Conference on Robotics and Automation (ICRA), pp. 987-993, May 3-7, 2010) describes, in addition to a novel semi-reactive planning algorithm, further approaches to determining possible trajectories to a target site.

SUMMARY

The present invention relates to a method for generating a signal for transferring a partly or highly automated vehicle into a safe system state at a target site. Firstly a need to transfer the vehicle into a safe system state is ascertained. Then a vehicle state is determined, the vehicle state encompassing the current vehicle position. An embodiment of the present invention includes execution of the following steps:
 ascertaining at least one target site;
 ascertaining travel trajectories from the current vehicle position to the at least one target site;
 rating the travel trajectories;
 selecting one of the travel trajectories based on the rating that has been carried out;
 generating the signal on the basis of the selected travel trajectory.

An advantage of the example method according to the present invention lies in the selection of the trajectory to be traveled. Thanks to the rating, the optimum trajectory can be selected based on safety-relevant criteria, with the result that the safety of the vehicle occupants and of other traffic participants is enhanced when that trajectory is traveled. A tremendous added value is achieved as a result of the method, especially for highly automated vehicle systems.

A "safe vehicle state" is understood in this method as "the vehicle at a standstill after reaching the target site"; "safe" is to be understood here in relative terms. Priorities with regard to safety can change depending on the existing state of the vehicle and/or state of the driver. If an immediate hazard situation does not exist, for example, then a suitable parking space would be traveled to or, if applicable, even a repair facility if that were necessary. If an emergency situation does exist, however, a "safe" parking position can also be understood as stopping on the road, if the situation is assessed to be safer than continuing to drive under the existing conditions that result from the state of the vehicle and/or the state of the driver.

In addition to the position of the vehicle, the "current vehicle state" can also be understood, for example, as the travel direction, speed, lane currently being driven in, information regarding further traffic participants, and current traffic situation.

In a preferred embodiment of the method the vehicle state and/or the driver state are ascertained in order to ascertain the need.

This embodiment offers the advantage that the need can arise as a function both of the vehicle state and of the driver state. This ensures that occupants of the vehicle, and other traffic participants, are optimally protected.

Monitoring of the driver can be accomplished in order to ascertain the driver state, for example using common methods of interior sensing made up of cameras and optionally sensors for measuring the state of health of the driver. The term "driver" does not obligatorily have be understood here as a single person; this term can also encompass all occupants present in the vehicle. The term must in any event be construed more widely in the case of highly automated vehicles because a driver possibly may no longer be necessary, and in this embodiment of the method the state of at least one vehicle occupant is therefore monitored. This monitoring can be used to rate the state of the vehicle occupant and/or of the driver, and a need to transfer the vehicle into a safe system state can be derived based on that state. A need would exist, for example, if the vehicle occupant becomes unconscious or suffers a heart attack or stroke. The driver state could moreover also be ascertained via a rating of inputs of a vehicle occupant, for example in the form of voice commands or actuation of an emergency button.

Instead of or in addition to consideration of the state of at least one vehicle occupant, the vehicle state can also be included in the ascertainment of a need. This includes, for example, the functionality of the vehicle. If that functionality is limited, a need can again arise. The "functionality" of the vehicle can be understood, for example, as the functionality of sensors present in and/or on the vehicle, in particular of environmental sensor equipment that is present and is essential for performing a specific automatic driving function. Monitoring of the functionality of all mechanical functions can also be carried out; this can identify, for example, a limitation in the power steering, the brakes, or components of the drive train. Failures or limitations of driver assistance systems or highly automatic vehicle functions are also embraced by the term "functionality of the vehicle."

The "vehicle state" can furthermore also encompass information about the driving state, i.e. including position, travel direction, speed, and information about the traffic situation. The vehicle state can also encompass extraordinary events such as a flat tire, stone impact, or fire in the vehicle.

In a further embodiment of the method the performance of the vehicle is ascertained, and the ascertained performance is used to rate the travel trajectories.

This embodiment has the advantage that the performance of the vehicle is included in the rating of the travel trajectories. The "performance" can be understood here as the vehicle state. In particular, information regarding the functionality of environmental sensor equipment that is present, and the functionality of the components for driving and controlling the vehicle, is included. For example, if certain driving maneuvers cannot be carried out or can be carried out only in limited fashion, this is taken into consideration in the rating of the travel trajectories. If certain regions can no longer be viewed and/or checked for travelability due to the limited functionality of sensors, this is likewise taken into consideration. In the event of severe damage to the vehicle or particular hazard situations that have been recognized in the context of ascertaining performance, a maximally short and/or quickly travelable travel trajectory to a corresponding target site will correspondingly be highly rated.

In a particularly preferred embodiment of the method, expected localization accuracies along the ascertained travel trajectories are calculated, and those localization accuracies are used to rate the travel trajectories.

The "localization accuracy" of the vehicle is understood as the accuracy with which the vehicle is localizable with the aid of systems for accurate determination of the vehicle's position. The following contribute, for example, to the localization accuracy: GPS signal strength and number of GPS satellites reachable along the route, number of mobile radio towers for location via the mobile radio network, accuracy of map data along the route, number of landmarks present along the route which can improve localization accuracy, and further route properties usable for localization.

This embodiment offers the advantage that a rating is made on the basis of the expected localization accuracy of the vehicle along the corresponding travel trajectory. This allows safety along that travel trajectory to be enhanced, especially in the case of vehicles controlled in highly automated fashion. If an automatically controlled vehicle has difficulty ascertaining its position and/or travel path, the risk of the automatically controlled vehicle causing traffic interference and/or an accident then rises sharply.

In a further preferred embodiment of the method the expected localization accuracy along a travel trajectory is calculated on the basis of landmarks along that travel trajectory.

In this embodiment the localization accuracy along the travel trajectory is calculated with the aid of landmarks that are present along that travel trajectory. In this embodiment, localization of the vehicle is additionally improved with the aid of landmarks that are detected by way of suitable environmental sensor equipment present in the vehicle. A calculation of the localization accuracy for each travel trajectory can thus be carried out by taking into consideration the landmarks that are detectable by the environmental sensor equipment along the travel trajectories.

In a further embodiment of the method a functionality of environmental sensor equipment present in the vehicle is determined in the context of ascertaining the performance of the vehicle, and that functionality is used for calculation of the expected localization accuracy.

This embodiment offers the advantage that with the aid of the ascertained functionality of environmental sensor equipment present in the vehicle, it is possible to calculate which landmarks are detectable by the functional environmental sensor equipment. Landmarks that should be detectable with fully functional environmental sensor equipment are, for example, not taken into account in the calculation of the localization probability along the trajectory if it has been established, by ascertaining the performance of the environmental sensors, that corresponding landmarks are no longer within the detection range of the remaining environmental sensors.

In a further embodiment of the method, curves in the ascertained travel trajectories are determined, and those curves are used to rate the travel trajectories.

This embodiment offers the advantage that a further criterion with which the localization accuracy along the corresponding travel trajectory can be further optimized can be employed to rate the travel trajectories. For example, if odometry is used in the vehicle for better localization of the vehicle, then the smaller the curves in the trajectory to be traveled, the greater the accuracy of that method. Localization accuracy can thus be further improved by selecting travel trajectories with limited curves. "Odometry" refers to a method for estimating the position and orientation (position estimation) of a mobile system based on data from its propulsion system.

In a further embodiment of the method a first and at least one second target site are ascertained, the ascertained target sites being rated.

This embodiment offers the advantage that multiple target sites, and thus also a greater number of travel trajectories, can be rated; this in turn increases the probability of ascertaining a travel trajectory that can be traveled as safely as possible.

In an advantageous refinement of the method, selection of one of the travel trajectories is accomplished based additionally on the rating of the at least two target sites.

This embodiment offers the advantage that a rating of the target sites is also included in the rating of the travel trajectories. Different criteria for rating of the target sites can be utilized in this context. For example, the possibility of localizing the target site can be taken into consideration so that, if applicable, an emergency call can be made indicating the exact vehicle position. The probability of a collision and/or interference with other traffic participants can furthermore be included in the rating of the target site. Preferred target sites would then be, for example, parking facilities, shoulder, parking lanes, or emergency stopping areas. Information regarding reachable target sites can be requested, for example, from a map server.

In a further embodiment of the method a probability value that is calculated from a probability of a collision with other traffic participants, and/or of interference with other traffic participants, at that target site is used for ascertaining the at least one target site.

This embodiment advantageously helps ensure that a target site which is as safe as possible is traveled to, and that the probability of interference with other traffic participants, or of accidents, is decreased. The probability value can be calculated, for example, using accident research data with which statistics regarding accident probabilities at different stoppage positions can be generated.

In a further embodiment of the method, map information is taken into consideration in ascertaining the at least one target site.

This embodiment offers the advantage that suitable target sites can be selected with the aid of map information. Corresponding target sites can either already be noted in the maps or alternatively can be derived from the roads and from environmental data of the map. Consideration of map information allows the search region for target sites to be enlarged, and the number of target sites for consideration to be increased.

The present invention also provides an apparatus for generating a signal for transferring a partly or highly automated vehicle into a safe system state at a target site, which apparatus is configured to carry out the method according to the present invention.

Also provided is a computer program that is configured to execute all steps of the method according to the present invention.

Further details, features, feature combinations, advantages, and effects on the basis of the present invention are evident from the description below of the preferred exemplifying embodiments of the present invention, and from the figures.

DETAILED DESCRIPTION OF EXAMPLE EMBODIMENTS

Figure 1:
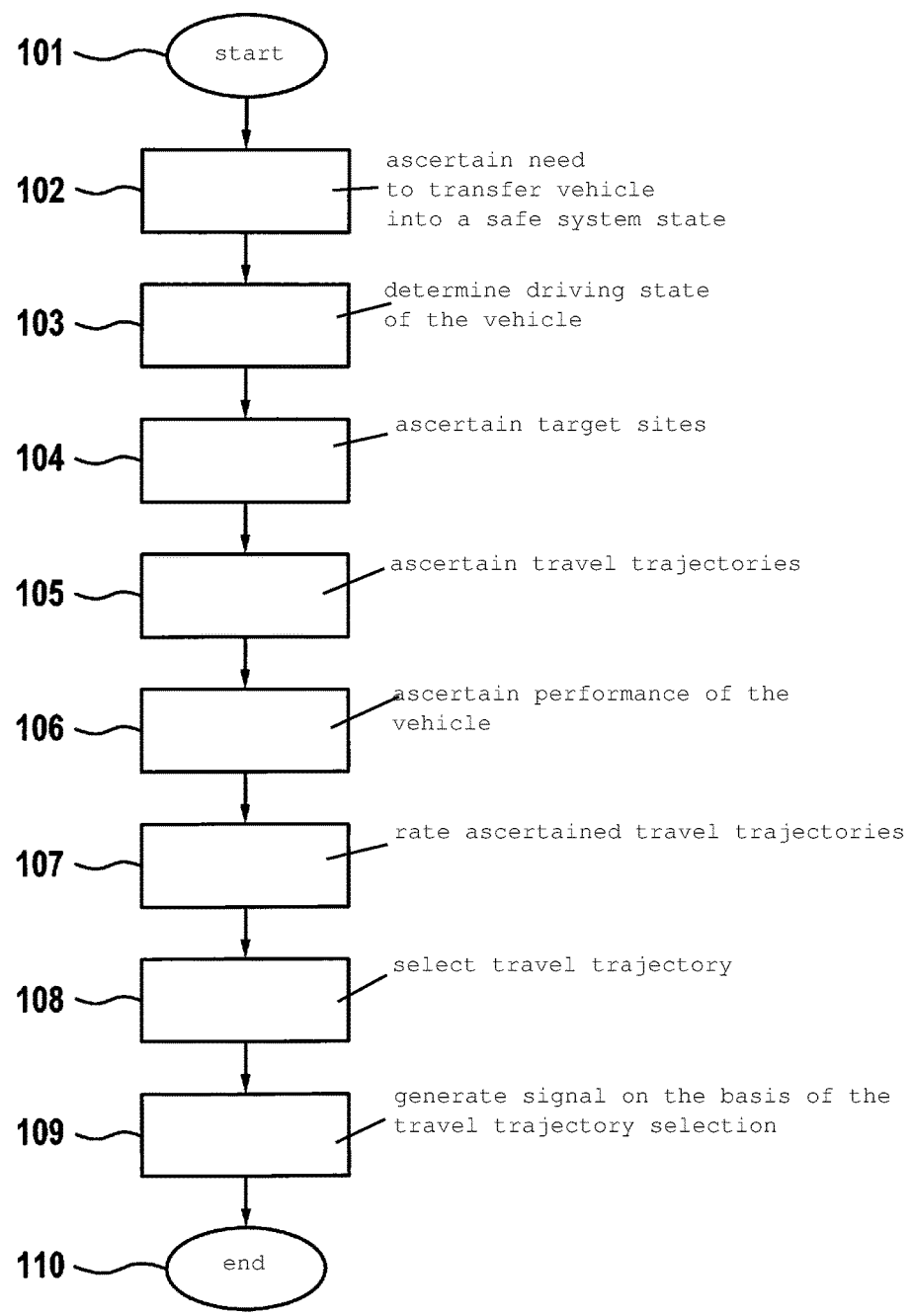
FIG. 1 is a schematic flow chart of an exemplifying method.

FIG. 1 depicts an example of execution of the example method in a vehicle 201. The vehicle is equipped with a corresponding first apparatus on which a computer program is configured to execute the method. Vehicle 201 is furthermore equipped with sensors for environmental sensing, and optionally also with sensors for interior sensing. A second apparatus can also be provided in vehicle 201, which apparatus receives the signal, generated on the basis of a selected travel trajectory 204, 205, of the first apparatus and, based on that signal, carries out an application of control to corresponding actuators of vehicle 201 in order to guide the latter automatically along the selected trajectory 204, 205.

The method starts in step 101.

In step 102 the need to transfer vehicle 201 into a safe system state is ascertained. For this, the driver state and/or the vehicle state is ascertained. The interior sensing system of vehicle 201 is used to ascertain the driver state.

Monitoring of the driver state, or of the state of a vehicle occupant, is accomplished here using known methods. The vehicle occupant is observed with an interior camera, and his or her state is evaluated on the basis of the camera images. The latter can supply, for example, eye movement, body temperature, body posture, unusual movement sequences, and further details. In addition, sensors can be provided in vehicle 201 which measure current values of the vehicle occupant that are useful for medical diagnosis, among them his or her blood pressure, blood sugar level, and body temperature. EKG data of the vehicle occupant can also be monitored.

Important driving functions and sensors can be investigated with regard to their functionality in order to ascertain the vehicle state. For this, for example, error messages of individual vehicle subsystems can be detected as an input signal, and their state can be deduced from those signals. Logical associations are also conceivable, for example in which combining the signals of specific subsystems indicates faults in other subsystems.

If it is established in the context of ascertaining the vehicle state that there exists a limitation of the system on the basis of which safety could be impaired, for example in the form of failure of an image sensor, then a need to transfer vehicle 201 into a safe system state is consequently identified. The same is true for the case in which it is established in the context of ascertaining the driver state that, for example because of health problems, the driver is no longer capable of taking control of the vehicle or that assistance is needed.

In general, it is possible to ascertain on the basis of stored scenarios whether the currently existing state (driving state and driver state) generates such a need.

If it is established in step 102 that a need to transfer vehicle 201 into a safe system state exists, then the driving state of the vehicle is determined in step 103. Here the current vehicle position, travel direction, and optionally the lane currently being traveled in, the current speed, and current traffic situation are ascertained. The traffic situation can be ascertained by collecting all information regarding those roadways in the close vicinity which could be traveled by vehicle 201. The information encompasses, for example, traffic jams, construction sites, and similar traffic impediments or vehicle accumulations.

In step 104, target sites 208, 209 at which vehicle 201 can be transferred into a safe system state are ascertained. On the one hand it is possible to use for this the environmental sensor equipment, with which target sites 208, 209 located, for example, within visual range can be ascertained or a shoulder or parking space can be looked for. In addition, further target sites 208, 209 that can be arrived at can be ascertained with the aid of map information and the current vehicle position. The travel direction, lane currently being traveled in, and current speed can also be taken in consideration, inter alia, for this. On expressways in particular, the travel direction is essential, and depending on the lane being traveled in and on the speed, it may be that specific parking areas can no longer be reached because a lane change and a necessary deceleration of the vehicle are no longer possible. The current traffic situation can also be taken into consideration in the selection of target sites 208, 209, since it can provide information as to how much time is needed to convey the vehicle to a corresponding target site 208, 209.

In this example, probability values that indicate the probability of a collision with other traffic participants at the corresponding target sites 208, 209 are used to assist in ascertaining target sites 208, 209. The calculation of this probability can be based on accident research data with which it is possible to determine for certain locations, based on accident data, how frequently accidents occur at a comparable location (for example a shoulder). The probability value does not need to be expressed as a percentage, but instead can contain, for example, three steps (low, medium, and high probability). An association between the numerical values from accident research and the aforementioned steps can be achieved, for example, using fuzzy logic.

In step 105, travel trajectories 204, 205 from the current vehicle position to the ascertained target sites 208, 209 are ascertained. Depending on the target site 208, 209, the environmental sensor equipment and/or map material is used for this. A known approach, which is described for example in the publication of Fiorini et al. from the existing art set forth above, is used in this example to ascertain travel trajectories 204, 205. According to this approach, the states of the other vehicles can also be taken into consideration in determining trajectories 204, 205. From a possible set of trajectories 204, 205 to a target site 208, 209, i.e. a set that can be traveled to in consideration e.g. of the vehicle model and the available space, n trajectories are selected based on a search algorithm using a minimization method.

In step 106 the performance of vehicle 201 is ascertained. As in the case of ascertaining the vehicle state, here the functionality of the environmental sensor equipment and of the components for automatic control of vehicle 201 is checked. Ascertainment is effected especially with a view toward detecting limitations of vehicle 201 in a context of automatic control. Important information here includes, for example, information regarding failed sensors that limit the viewing region, and limited capabilities for controlling the vehicle, for example steering, braking, or speed.

In step 107 the ascertained travel trajectories 204, 205 are rated. For this, the expected localization accuracy of vehicle 201 along travel trajectories 204, 205 is calculated. This can be done, for example, on the basis of landmarks 206, 207 disposed along travel trajectory 204, 205 which are used to localize vehicle 201. A probabilistic model offers the basis for estimating the expected localization accuracy along travel trajectory 204, 205. For derivation of the model it is assumed that the global vehicle position is obtained from matching between landmarks 206, 207 of a global localization map and corresponding landmark measurements. Error propagation can be carried out for the algorithms to be used for this. The resulting probabilistic model describes the correlation between the input variables (corresponding landmarks, error model for landmark measurement) and the expected uncertainty (variance) in the estimate of the global vehicle position. The model is provided in closed analytical form (i.e. iterative calculation methods are not required) and provides estimates of the localization accuracy for a given assemblage of landmarks 206, 207 which are known from map information (in this case from a highly accurate map). Thanks to the analytically closed form, rating of the trajectories is associated with a low calculation outlay.

The performance of vehicle 201 can furthermore be included in the rating of travel trajectories 204, 205. For example, if optical parts of an installed camera are dirty or if a camera for observation of a specific region fails, landmarks 206, 207 that can no longer be detected because of the limitation of the sensor equipment then will not be taken into consideration in the calculation of localization accuracy. In addition, possible concealment effects of landmarks 206, 207 due to static objects along a specific travel trajectory 204, 205 can also be included in the calculation, with the result that, for example, a travel trajectory 204, 205 in a different lane would be preferred.

Concealment effects due to moving objects can also be incorporated into the rating of travel trajectories 204, 205. For example, the probability of concealment of objects on the right side of a two-lane roadway is to be estimated to be higher if vehicle 201 is traveling in the left lane than if it were traveling in the right lane. Motor vehicles 203, 203 and trucks 202, 203 in the right lane can conceal specific landmarks 206, 207.

If further sensors are limited in terms of their functionality, for example GPS sensors, sensors for location via mobile radio signals, yaw rate sensors, rotation rate sensors, acceleration sensors, wheel rotation speed sensors, radar, lidar, or ultrasound sensors, or any other sensors usable for determining a driving state, they can have corresponding effects on the rating of travel trajectories 204, 205.

If vehicle 201 is limited in terms of its freedom of movement, for example if only certain steering angles can be achieved, this can likewise be included in the rating of travel trajectories 204, 205. In this case a travel trajectory 204, 205 having too sharp a curve would be excluded.

In addition to the localization of vehicle 201 with the aid of landmarks 206, 207 that are detected by the environmental sensor equipment, odometry in vehicle 201 can also be used as an alternative localization method. Because sharp curves in travel trajectory 204, 205 can have a negative effect on the accuracy of this localization method, when odometry is used, travel trajectories 204, 205 can be rated on the basis of curves that occur.

Lastly, before a travel trajectory 204, 205 is selected, the ratings for target sites 208, 209 corresponding to travel trajectories 204, 205 can be included in the rating of travel trajectories 204, 205. For example, if two travel trajectories 204, 205 to different target sites 208, 209 have similarly good ratings, the location of target site 208, 209 can be definitive for the final selection of trajectory 204, 205. The localization accuracy of target site 208, 209, and the probability of a collision with other traffic participants or of interference, can enter into the rating of target site 208, 209.

In step 108, a travel trajectory 204, 205 that is to be traveled to is selected. The selection is made based on the rating arrived in step 107, the best-rated trajectory 204, 205 being selected.

In step 109 a signal is generated on the basis of the travel trajectory selection carried out in step 108. The signal can contain information regarding waypoints, speeds, and accelerations. These indications can be provided in the vehicle reference system or in a map reference system. In this exemplifying embodiment two forms are preferably used:

1) If stable communication with a map server and a sufficiently functional environmental sensing system can be ensured, a travel trajectory 204, 205 in the map reference system is then used. Map-relative localization can thus be carried out. As a result, there is no drift in the estimate of the vehicle position due to inaccurate odometry.

2) The preferred variant form for a vehicle system having considerable functional limitations (particularly in terms of communication with a map server) and limited environmental awareness is an indication of the vehicle trajectory in the vehicle reference system, since safe travel is thereby possible even without map material.

Depending on the embodiment of the method according to the present invention and how it is used, the signal can be sent directly to a corresponding vehicle controller that applies control to corresponding actuators of vehicle 201 so that the latter is steered along travel trajectory 204, 205. Alternatively, the signal can also be sent to a further control device that processes the information and then initiates automatic travel along the travel trajectory.

The method ends at step 110.

The sequence of steps in this method is also modifiable. For example, performance can already be ascertained before travel trajectories 204, 205 are ascertained, and thus already included in travel trajectory planning.

Figure 2:
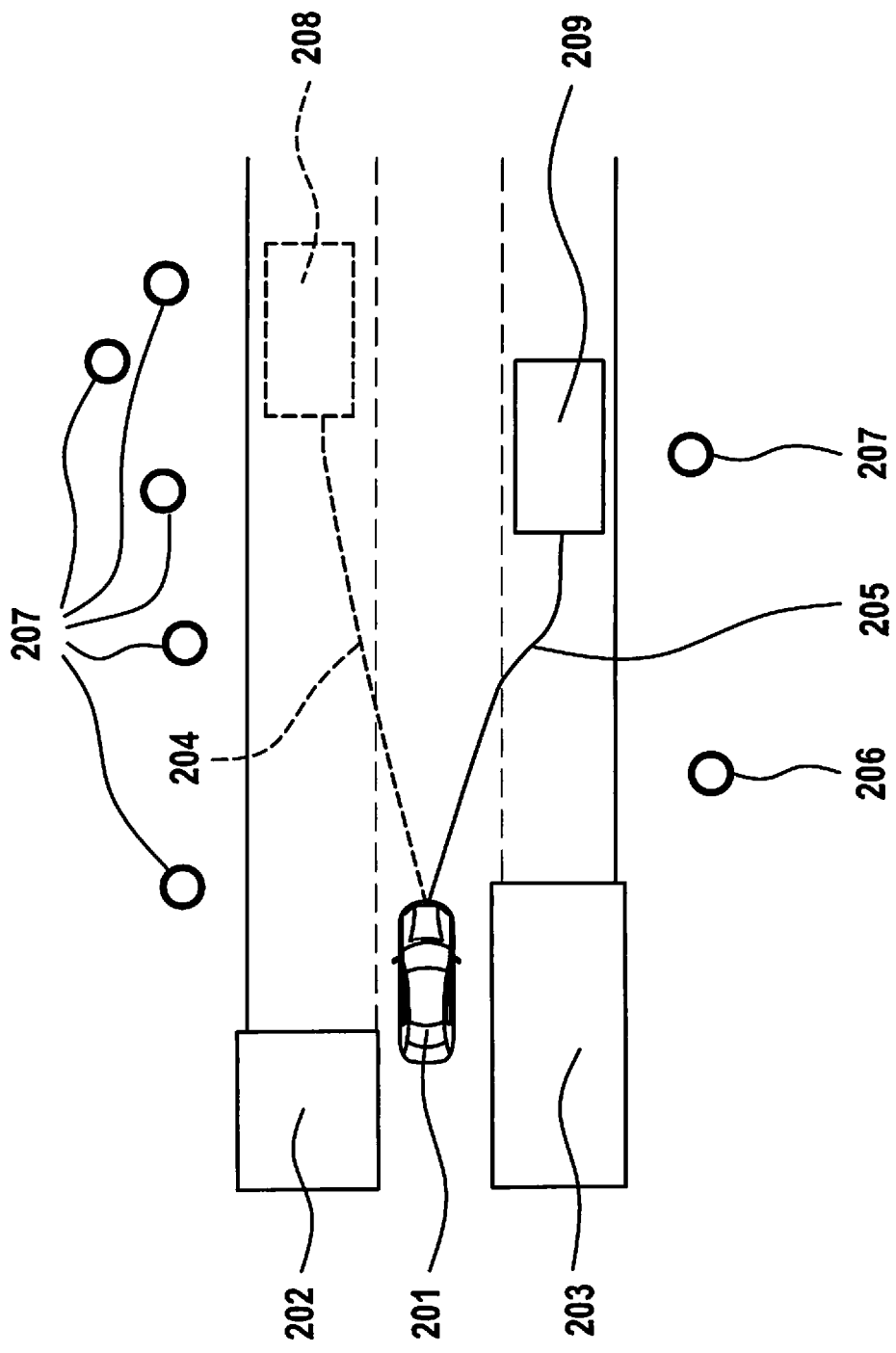
FIG. 2 shows an example of the rating of different travel trajectories.

FIG. 2 depicts by way of example the criteria on the basis of which the travel trajectory can be selected.

In this example, vehicle 201 is traveling on a three-lane expressway and thus has the option of driving in all three lanes. In the left lane a truck 202 is approaching from behind and limiting the environmental sensor equipment of vehicle 201. The same applies to truck 203 on the right side of vehicle 201, as a result of which the environmental sensor equipment of vehicle 201 cannot detect landmark 206.

FIG. 2 depicts two target sites 208, 209 and a travel trajectory 204, 205 respectively corresponding to target sites 208, 209. Travel trajectories 204, 205 are rated on the basis of the expected localization accuracy of vehicle 201 along trajectories 204, 205, calculation of the localization accuracy being accomplished on the basis of landmarks 206, 207 that are present.

Because the rating of trajectory 204 ends up being higher because of the plurality of detectable landmarks, this travel trajectory 204 is selected and a corresponding signal is generated on the basis of that selection.

What is claimed is:

1. A method for generating a signal for transferring a partly or highly automated vehicle into a safe system state at a target site, the method comprising:
    ascertaining, via a processor, a need to transfer the vehicle into a safe system state;
    determining, via the processor, a vehicle state, the vehicle state including a current vehicle position;
    ascertaining, via the processor, at least one target site;
    ascertaining, via the processor, travel trajectories from the current vehicle position to the at least one target site;
    rating, via the processor, the travel trajectories;
    selecting, via the processor, one of the travel trajectories based on the rating;
    generating, via the processor, the signal based on the selected travel trajectory; and
    transferring, via the processor and based on the signal, a partly or highly automated vehicle into a safe system state at a target site;
    wherein expected localization accuracies along the ascertained travel trajectories are calculated, and those localization accuracies are used to rate the travel trajectories.

2. The method as recited in claim 1, wherein at least one of: i) a vehicle state, and ii) a driver state, are ascertained in order to ascertain the need.

3. The method as recited in claim 1, wherein a performance of the vehicle is ascertained, and the ascertained performance is used to rate the travel trajectories.

4. The method as recited in claim 1, wherein the expected localization accuracy along a travel trajectory is calculated on the basis of landmarks along that travel trajectory.

5. The method as recited in claim 1, wherein a functionality of environmental sensor equipment present in the vehicle is determined in the context of ascertaining the performance of the vehicle, and that functionality is used for calculation of the expected localization accuracy.

6. The method as recited in claim 1, wherein curves in the ascertained travel trajectories are determined, and the determined curves are used to rate the travel trajectories.

7. The method as recited in claim 1, wherein a first and at least one second target site are ascertained, the ascertained target sites being rated.

8. The method as recited in claim 7, wherein selection of one of the travel trajectories is accomplished based additionally on the rating of the at least two target sites.

9. The method as recited in claim 7, wherein a probability value that is calculated from a probability of at least one of: i) a collision with other traffic participants, and ii) interference with other traffic participants, at that target site is used for ascertaining the at least one target site.

10. The method as recited in claim 1, wherein map information is taken into consideration in ascertaining the at least one target site.

11. An apparatus for generating a signal for transferring a partly or highly automated vehicle into a safe system state at a target site, comprising:
    a transfer device having a processor configured to perform the following:
        ascertaining, via the processor, a need to transfer the vehicle into a safe system state;
        determining, via the processor, a vehicle state, the vehicle state including a current vehicle position;
        ascertaining, via the processor, at least one target site;
        ascertaining, via the processor, travel trajectories from the current vehicle position to the at least one target site;
        rating, via the processor, the travel trajectories;
        selecting, via the processor, one of the of the travel trajectories based on the rating;
        generating, via the processor, the signal based on the selected travel trajectory; and
        transferring, via the processor and based on the signal, a partly or highly automated vehicle into a safe system state at a target site;
        wherein expected localization accuracies along the ascertained travel trajectories are calculated, and those localization accuracies are used to rate the travel trajectories.

12. A non-transitory computer-readable storage medium on which is stored a computer program, which is executable by a processor, comprising:
    a program code arrangement having program code for generating a signal for transferring a partly or highly automated vehicle into a safe system state at a target site, by performing the following:
        ascertaining, via the processor, a need to transfer the vehicle into a safe system state;
        determining, via the processor, a vehicle state, the vehicle state including a current vehicle position;
        ascertaining, via the processor, at least one target site;
        ascertaining, via the processor, travel trajectories from the current vehicle position to the at least one target site;
        rating, via the processor, the travel trajectories;
        selecting, via the processor, one of the travel trajectories based on the rating;
        generating, via the processor, the signal based on the selected travel trajectory; and
        transferring, via the processor and based on the signal, a partly or highly automated vehicle into a safe system state at a target site;
        wherein expected localization accuracies along the ascertained travel trajectories are calculated, and those localization accuracies are used to rate the travel trajectories.

* * * * *